United States Patent [19]
Arnett

[11] Patent Number: 5,889,819
[45] Date of Patent: Mar. 30, 1999

[54] EMI REDUCTION USING DOUBLE SIDEBAND SUPPRESSED CARRIER MODULATION

[75] Inventor: David W. Arnett, Corvallis, Oreg.

[73] Assignee: Hewlett-Packard Company, Palo Alto, Calif.

[21] Appl. No.: 695,093

[22] Filed: Aug. 8, 1996

[51] Int. Cl.⁶ .................................. H04L 7/00; H03C 1/52
[52] U.S. Cl. ........................ 375/270; 375/362; 327/162; 332/167
[58] Field of Search .................................... 375/354, 270, 375/277, 356, 357, 362, 364, 377, 200, 301, 321, 206; 327/162, 105, 107; 332/158, 167, 168; 329/356; 455/46, 109, 202; 331/47; 364/724.011, 724.012, 724.06, 724.08, 724.16, 724.19

[56] References Cited

U.S. PATENT DOCUMENTS

| | | | |
|---|---|---|---|
| 3,354,410 | 11/1967 | Beuscher | 331/78 |
| 3,566,036 | 2/1971 | Roche | 370/491 |
| 3,916,410 | 10/1975 | Elwood | 342/458 |
| 4,507,796 | 3/1985 | Stumfall | 375/376 |
| 5,491,458 | 2/1996 | McCune, Jr. et al. | 332/144 |

OTHER PUBLICATIONS

Hardin et al., "Spread Spectrum Clock Generation for the Reduction of Radiated Emmissions," IEEE Doc # 0–7803–1398; Apr. 1994.

Primary Examiner—Chi H. Pham
Assistant Examiner—William Luther

[57] ABSTRACT

In a computer or other digital system a clock or other synchronous signal is routed from a source to a destination as a double side band suppressed carrier (DSB-SC) signal. The clock or other synchronous signal is amplitude modulated at the source using a broadband low frequency envelope signal. The modulated signal is the DSB-SC signal, which then is routed over PC board traces to the destination. At the destination, the DSB-SC signal is demodulated to achieve the clock or other synchronous signal.

15 Claims, 3 Drawing Sheets

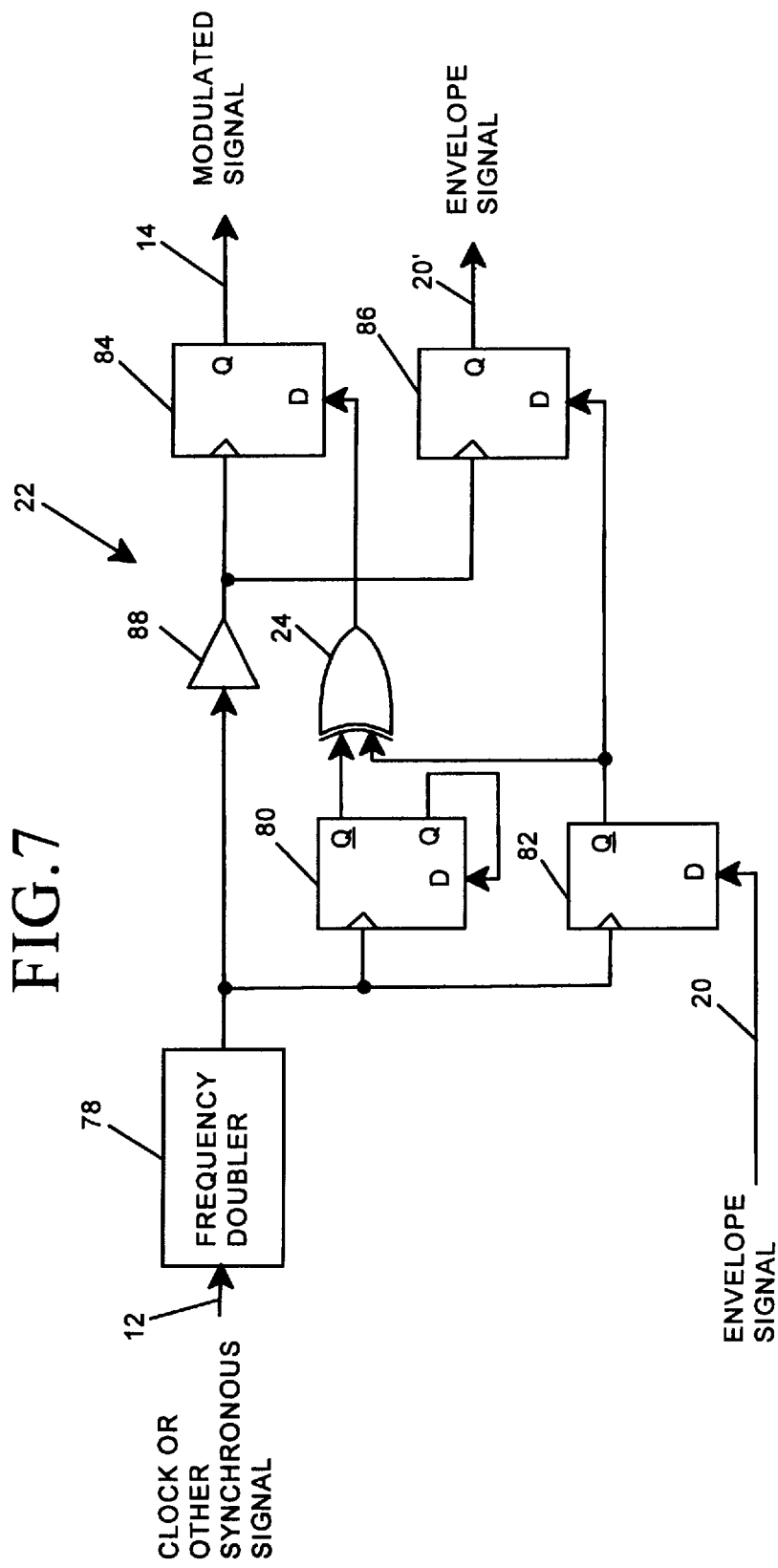

EMI REDUCTION USING DOUBLE SIDEBAND SUPPRESSED CARRIER MODULATION

CROSS REFERENCE TO RELATED APPLICATION

This application is the parent application of the commonly assigned co-pending application "Dual Side Band Suppressed Carrier Clock"; Ser. No. 08/741,489 filed on Oct. 30, 1996.

BACKGROUND OF THE INVENTION

This invention relates generally to methods and apparatus for reducing electromagnetic interference ('EMI') emissions from PC board traces in a digital system, and more particularly for reducing EMI emissions from clock and other synchronous signal traces for a computer or other digitally-clocked system.

Electromagnetic interference is electromagnetic energy emitted from electronic devices which, either directly or indirectly, contributes to a degradation in performance of an electronic receiver or other electronic system. EMI radiation from poorly shielded electronic devices, for example, degrade radio and television signals resulting in audible or visible static at receivers picking up such signals. Governments typically regulate EMI emissions to enhance public use of the radio wave spectrum and other electromagnetic wave spectra. In the United States, for example, the F.C.C. requires testing of devices and rates the devices by class according to their emissions. The United States F.C.C. Agency rates EMI emissions over a 120 kilohertz ("kHz") bandwidth. The 120 kHz bandwidth corresponds to the typical bandwidth of a conventional communication receiver, such as an FM receiver. Reduced EMI emissions within such bandwidth reduce the interference output, otherwise perceived by a listener or viewer as, for example, static or white noise.

Typical precautions taken by electronic manufacturers are to provide shielding of electronic devices to minimize EMI emissions. Computer manufacturers, for example, typically use shielded cables and shielded housings to minimize EMI emissions. This invention is directed toward a digital method and apparatus for reducing detectable EMI emissions within a critical bandwidth (e.g., 120 kHz).

SUMMARY OF THE INVENTION

According to the invention, a clock or other synchronous signal is amplitude modulated at a source. The modulated signal is a dual side band suppressed carrier (DSB-SC) signal which is routed via PC board traces to a destination, where the DSB-SC signal is demodulated. The modulation spreads the clock signal energy over a widened spectrum so as to reduce EMI emissions over a bandwidth of interest (e.g., 120 kHz).

According to one aspect of this invention, the carrier signal in the amplitude modulation process is the clock or other synchronous signal. For a computer system such signal typically has a high frequency of 1 megahertz ("MHz") or greater. The envelope signal for the amplitude modulation process is a low frequency broadband signal. Preferably, the envelope signal is a broadband rectangular wave signal varying in frequency. The primary frequency components (i.e., the fundamental frequencies) of the broadband signal preferably occur within a range up to one-half the frequency of the clock or other synchronous signal. Primary frequencies up to the clock signal frequency also may be used.

According to another aspect of the invention, the modulated DSB-SC signal and the envelope signal are routed from source to destination via a signal path including PC-board traces. At the destination the two signals are used to perform a demodulation process by which the clock or other synchronous signal is retrieved.

According to another aspect of the invention, the envelope signal is generated using a pseudo-random code generator. A key code or seed is input to the pseudo-random code generator to derive the envelope signal. In one embodiment, the source and destination each include a pseudo-random code generator. The key is either predefined and known to both the source and destination pseudo-random code generators, is sent to both the source and destination random code generators, or is sent from one to the other of the source and destination pseudo-random code generators. In such embodiments the envelope signal need not be routed from the source to the destination, but instead may be separately generated at each of the source and destination.

According to preferred embodiments, a method and apparatus for reducing EMI emissions attributable to synchronous signals at off-chip signal paths in a digital system is provided, (e.g., EMI emitted directly from such off-chip signal paths or from other signal paths coupled to such signal paths). The digital system includes a source circuit generating a first synchronous signal for distribution to a destination circuit. The first synchronous signal occurs at the source circuit and has a first signal frequency spectrum, including a first frequency and harmonics of the first frequency. A first envelope signal is present and has a first envelope frequency spectrum including frequencies not greater than the first frequency. The first envelope signal defines a first bandwidth. A modulation circuit within the source circuit receives the first synchronous signal and the first envelope signal. The first synchronous signal is amplitude modulated with the envelope signal to generate a dual side band suppressed carrier signal. A first signal path routes the dual side band suppressed carrier signal from the source integrated circuit chip to the destination integrated circuit chip. A second envelope signal having a second envelope frequency spectrum equal to the first envelope frequency spectrum and defining the first bandwidth is present at the destination circuit. A demodulation circuit within the destination circuit receives the dual side band suppressed carrier signal via the first signal path and receives the second envelope signal. The demodulation circuit amplitude demodulates the dual side band suppressed carrier signal using the second envelope signal to regenerate the first synchronous signal. Detectable EMI emissions attributable to the first synchronous signal are reduced by not routing the first synchronous signal from the source integrated circuit to the destination integrated circuit, and instead routing the dual side band suppressed carrier signal. The dual side band suppressed carrier signal has energy spread over the first bandwidth at each side band. The first bandwidth is wide enough to reduce detectable EMI emissions.

Preferably the lower edge of the DSB-SC signal left side band to the upper edge of the DSB-SC signal right side band spans at least 120 kHz. For adjoining side bands this is achieved using an envelope signal having a spectrum spanning from 0 to at least 60 kHz. For non-adjoining side bands this is achieved by using an envelope signal (i) having a spectrum commencing at more than 60 kHz; (ii) having a bandwidth greater than 60 kHz; or (iii) satisfying the following relationship: $2*f_4 + 2BW_{45} > 120$ kHz, where $f_4$ is the lowest frequency of the envelope signal spectrum and $BW_{45}$ is the envelope signal bandwidth. The envelope frequency spectrum upper frequency bound preferably is less than or equal to one-half the first frequency, although the upper bound alternatively may be as high as the first frequency.

In some embodiments a second signal path electrically coupling the source circuit and the destination circuit is included. The first envelope signal is routed from the source circuit to the destination circuit via the second signal path. In such case the second envelope signal is the received first envelope signal.

In some embodiments a first envelope signal generator is included at the source circuit for generating the first envelope signal. A second envelope circuit generator is included at the destination circuit for generating the second envelope signal. The first envelope signal generator receives a predefined key from which the first envelope signal is derived. Also, the second envelope signal generator receives the predefined key from which the second envelope signal is derived. In some embodiments the predefined key is changed, either periodically or aperiodically.

An advantage of the invention is that the signals routed from source to destination along the PC board traces have their energy spread across side bands of the modulated signal. The result is a reduction in EMI emissions from the PC board traces. EMI emissions attributable to the PC board traces also are reduced. For example, systems, circuits or traces having a signal path experiencing electromagnetically coupling to a PC board trace will have reduced EMI attributable to the synchronous signals flowing through the PC board trace. An advantage of using a predefined key for generating an envelope signal for the modulated signal is that only the modulated signal need be sent from source to destination, instead of both the demodulated signal and the envelope signal. These and other aspects and advantages of the invention will be better understood by reference to the following detailed description taken in conjunction with the accompanying drawings.

BRIEF DESCRIPTION OF THE DRAWINGS

FIG. 7 is a block diagram of an embodiment of a modulation circuit.

DESCRIPTION OF SPECIFIC EMBODIMENTS

Figure 1:
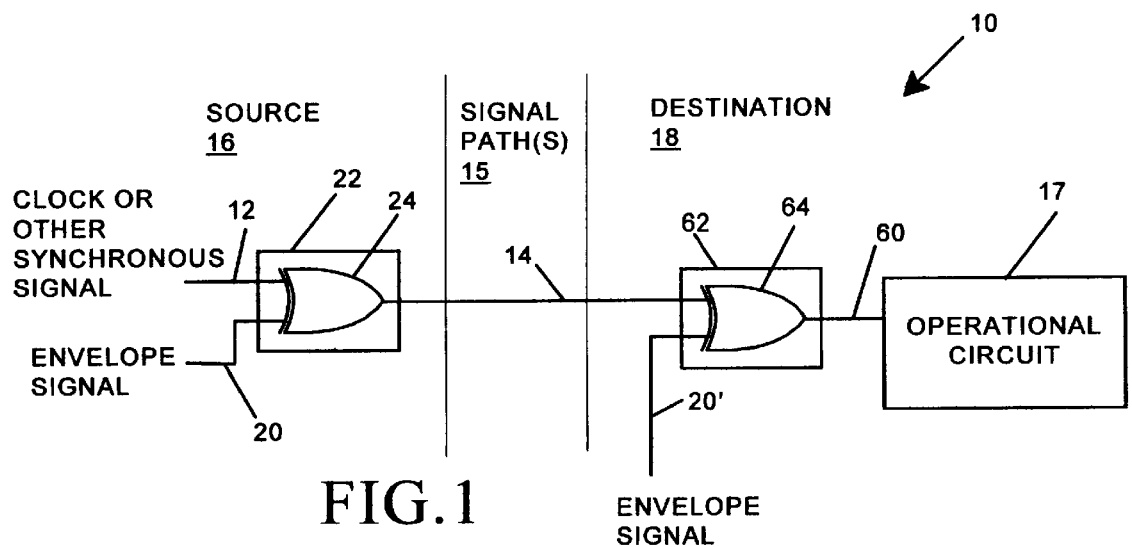
FIG. 1 is a block diagram of an apparatus for distributing a clock signal via suppressed carrier according to an embodiment of this invention.
Figure 2:
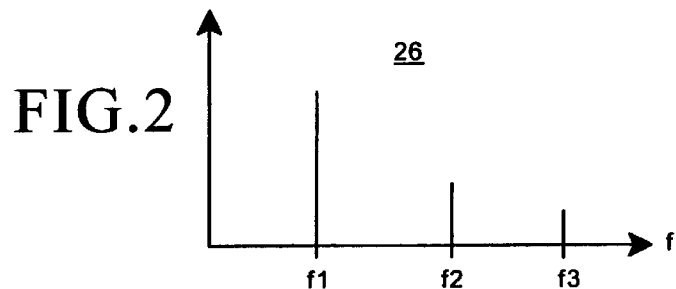
FIG. 2 is a chart of a frequency spectrum for an embodiment of the clock or other synchronous signal of FIG. 1.

FIG. 1 shows an apparatus 10 for distributing a clock or other synchronous signal 12 via a dual side band-suppressed carrier (DSB-SC) signal 14 according to an embodiment of this invention. In one embodiment a clock signal 12 is routed from a source circuit 16 to an operational circuit 17 of a destination circuit 18. The apparatus 10 is part of a computer or other digital system in which PC board traces and/or other off-chip or off-board conductive signal paths 15 electrically couple a source 16 and a destination 18. The PC board traces, for example, are formed as strips of metal or other conductive material. When a signal is routed over traces radiation is emitted from the strips into the surrounding environment, as like an antenna. Electromagnetic energy also may be coupled to neighboring traces and propagated into other circuits and systems where EMI occurs. The radiation energy is determined in part by the energy and frequency of the routed signal. For a conventional computer routed signals typically include the clock and other synchronous signals 12. Typically the clock or other synchronous signal 12 has a high frequency. Energy is radiated at such frequency (i.e., the primary or fundamental frequency) and at harmonics of such frequency. Such energy also is referred to as electromagnetic interference because it causes interference with other electromagnetic waves in the environment. Of particular concern are signals within the radio and television frequency spectrum. Interference with radio and television signals is perceived as static or white noise. Accordingly, EMI emissions occurring within the 120 kHz bandwidth of conventional electronic radio and television receivers is undesirable. Thus, it is an object of the invention to spread the energy of the clock signal an other synchronous signals 12 over a frequency band in excess of the 120 kHz bandwidth or another EMI-critical frequency bandwidth of interest. FIG. 2 shows an exemplary frequency spectrum 26 for a clock signal 12. The spectrum 26 includes a primary frequency $f_1$ (i.e., the clock signal frequency) and multiple harmonics $f_2$, $f_3$ of the primary frequency.

Figure 3:
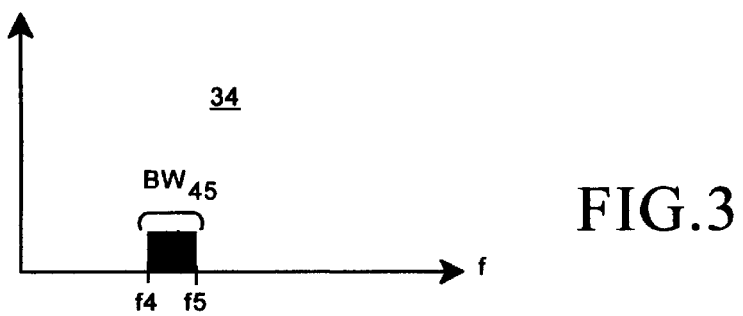
FIG. 3 is a chart of a frequency spectrum for an embodiment of the envelope signal of FIG. 1.

To spread the energy of the clock signal 12 over a broad spectrum, the clock signal 12 is amplitude modulated with an envelope signal 20. The envelope signal 20 is a broadband signal having a frequency spectrum including primary frequencies not higher than the clock signal primary frequency, $f_1$. Preferably, the envelope signal primary frequencies do not exceed one-half the clock signal primary frequency. FIG. 3 shows an exemplary frequency spectrum 34 for a broad band, rectilinear-wave, envelope signal 20. The envelope signal frequency spectrum 34 spans from a first frequency $f_4$ to a second frequency $f_5$ to define a bandwidth $BW_{45}$.

Figure 4:
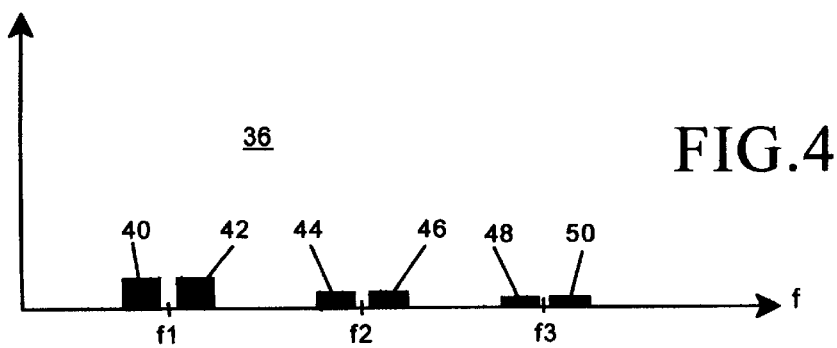
FIG. 4 is a chart of the modulated signal of FIG. 1 according to an embodiment of this invention.

A modulation circuit 22 is used to amplitude modulate the clock signal or other synchronous signal 12 with the envelope signal 20. In one embodiment the modulation circuit 22 includes an exclusive 'OR' gate 24. The modulated signal 14 output from the modulation circuit 22 is a dual side band suppressed carrier signal. FIG. 4 shows an exemplary frequency spectrum 36 of a modulated signal 14 derived from the clock signal 12 of FIG. 2 and the envelope signal 20 of FIG. 3. Note that by using amplitude modulation, the modulated signal 14 is a dual side band suppressed carrier signal. Comparing FIGS. 2 and 4 it is seen that the energy of the primary frequency $f_1$ is spread over two side bands 40, 42. Similarly the energy of the first harmonic $f_2$ is spread over two side bands 44, 46 and the energy of other harmonics (e.g. $f_3$) are spread over respective dual side bands (e.g., 48, 50). Note that each side band 40–50 has a bandwidth equal to the bandwidth $BW_{45}$ of the envelope signal 20 (See FIG. 3). Thus, by using a wide bandwidth envelope frequency spectrum the clock signal energy is spread beyond the 120 kHZ bandwidth of interest (or another EMI critical bandwidth of interest).

To achieve spreading of more than 120 kHz, the primary frequencies defining the envelope signal frequency spectrum conform to the following equation (I):

$$2*f_4+2BW_{45}>F_{critical} \qquad \text{(I)}$$

where, $f_4$ is the lowest frequency of the envelope signal spectrum;

$BW_{45}$ is the envelope signal bandwidth; and $F_{critical}$=120 kHz or another EMI critical frequency of interest.

Equation (I) is equivalent to the following equation (II):

$$f_5 > (F_{critical}/2) \quad (II)$$

where $f_5$ is the highest frequency of the envelope signal spectrum;

For $F_{critical}$=120 kHz the lower frequency of the DSB-SC signal left side band 40 to the upper frequency of the DSB-SC signal right side band 42 spans at least 120 kHz. For adjoining side bands 40, 42 forming one continuous band centered at $f_1$ this is achieved using an envelope signal having a spectrum 34 spanning from $f_4$=0 to $f_5$>60 kHz. For non-adjoining side bands one solution is to use an envelope signal having a spectrum commencing at $f_4$>60 kHz. Another solution is to have the bandwidth $BW_{45}$>60 kHz. Another solution is to have $f_5$>60 kHz. In other embodiments other solutions to equation (I) are used. Preferably, the envelope frequency spectrum 34 upper frequency bound $f_5$ is less than the first frequency. The envelope frequency spectrum 34 for best mode embodiments includes frequencies less than one-half the clock signal frequency, $f_1$. By using an envelope signal frequency spectrum 34 conforming to equations (I) or (II) there is a substantial decrease in detectable EMI emissions about the primary frequency, $f_1$ and the various harmonics $f_2$, $f_3$ (e.g., less energy in frequencies within range $f_1 \pm F_{critical}/2$, $f_2 \pm F_{critical}/2$, $f_3 \pm F_{critical}/2$).

Referring again to FIG. 1, the modulated signal 14 exhibiting the frequency spectrum 36 of FIG. 4 is routed from source 16 to destination 18 via conductive signal path(s) 15. Thus, the signal routed over the PC board traces and other radiation emitting signal paths has its energy significantly spread over a wide bandwidth. As a result, a substantial portion of the EMI emissions will be filtered out by conventional receiver devices, (e.g., frequencies outside of the ranges $f_1 \pm 60$ kHz, $f_2 \pm 60$ kHz, $f_3 \pm 60$ kHz are filtered out). Further, unfiltered EMI emissions picked up by conventional receiver devices are at a substantially reduced energy level. At the destination 18 the modulated signal 14 is demodulated to retrieve the clock or other synchronous signal 12 as an output clock or other synchronous signal 60. A demodulation circuit 62 is used to amplitude demodulate the modulated signal 14. In one embodiment the demodulation circuit 62 includes an exclusive 'OR' gate 64. The amplitude and frequency of the clock signal 12 input to the modulator 22 at the source 16 are substantially the same as the amplitude and frequency of the clock signal 60 output from the demodulator 62 at the destination 18. Also, the phase relationship between the clock signal 12 and the clock signal 60 is constant.

Figure 5:
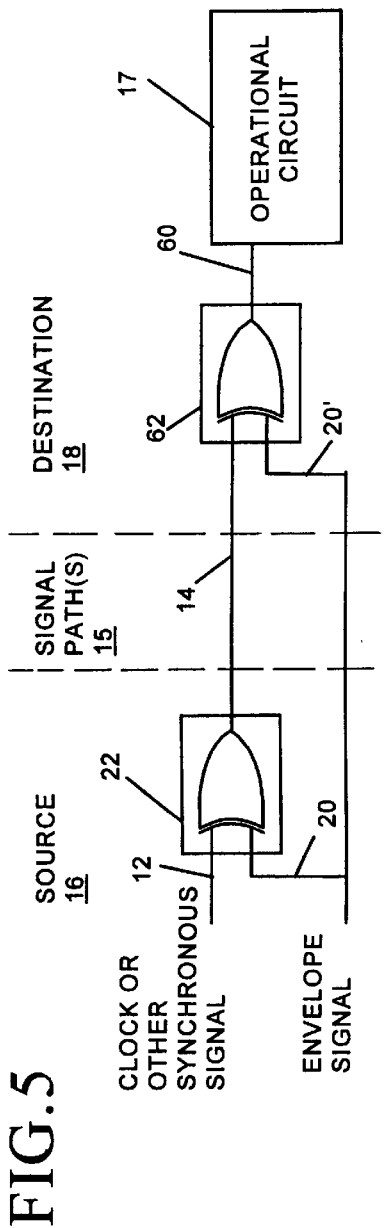
FIG. 5 is a block diagram of an apparatus for distributing a clock signal via suppressed carrier according to another embodiment of this invention.

To perform the demodulation operation the demodulator 62 receives the modulated signal 14 and an envelope signal 20'. The envelope signal 20' used at the destination 18 has the same amplitude and frequency pattern as the envelope signal 20 used at the source 16. Preferably, the envelope signal 20' and modulated signal 14 are phase aligned at the demodulation circuit 62 or prior to being input to the demodulation circuit 62. FIG. 5 shows an embodiment in which the envelope signal 20 is routed from the source 16 to the destination 18 over PC board traces and/or other off-chip or off-board conductive signal paths 15. Alternatively the same envelope signal 20 is routed to both the source 16 and destination 18.

Figure 6:
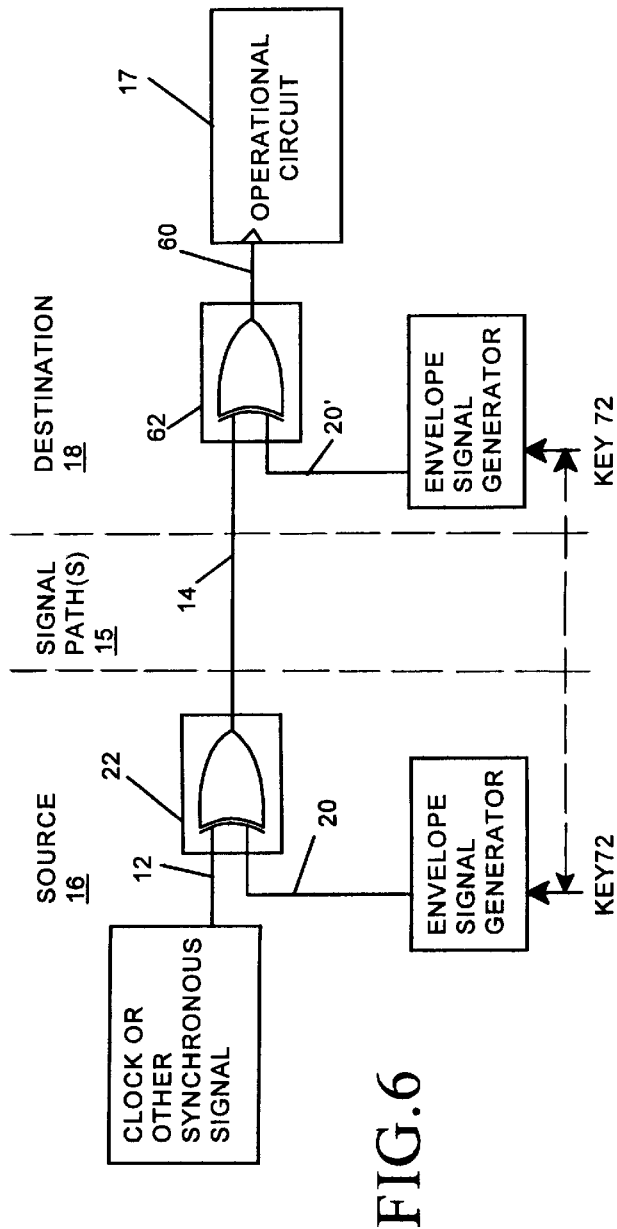
FIG. 6 is a block diagram of an apparatus for distributing a clock signal via suppressed carrier according to yet another embodiment of this invention.

In another embodiment the envelope signals 20, 20' are derived separately at the source 16 and destination 18. For the demodulation process to be accurate, and result in substantially the same signal pattern in the input clock signal 12 and output clock signal 60, the signal pattern of the envelope signals 20 and 20' at the source 16 and destination 18 are to be the same. FIG. 6 shows an embodiment of the apparatus for distributing a clock or other synchronous signal 12 in which an envelope signal generator circuit 70 is located at both the source 16 and destination 18. In one embodiment the envelope signal generator 70 is a pseudo-random code generator responsive to a key or other seed 72. By inputting the same key 72 to the source's envelope signal generator 70 and the destination's envelope signal generator 70, the same envelope signal 20, 20' is produced at the source 16 and destination 18. According to various embodiments, the key 72 is predefined and stored at both the source and destination, is routed to both the source 16 and destination 18 envelope signal generator 70, or is routed from one of the source and destination envelope signal generator 70 to the other. In embodiments in which a key is changed, periodically or aperiodically, and routed to either or both of the source and destination envelope signal generators 70, the time period between key changes is preferably greater than that of any resulting envelope signal 20.

Referring to FIG. 7 a schematic block diagram of one embodiment of a modulation circuit 22' is shown. The modulation circuit 22' includes a frequency doubler 78, a set of D flip-flops 80, 82, 84, 86, inverter 88 and the exclusive OR gate 24. The frequency doubler 78 doubles the frequency of the clock or other synchronous signal 12 to precisely define each edge of the clock signal or other synchronous signal. The exclusive OR gate 24 performs the modulation of the clock signal and envelope signal. The flip-flops 80–86 set the phase relations of signals input to the exclusive OR gate 24 so as to prevent signal glitches from being transmitted from the modulation circuit 22 (e.g., to the demodulator 62). Specifically, because the outputs of flip-flops 80, 82 could change at the same time causing a glitch at the exclusive OR gate 24 output. Flip-flops 84, 86, however, prevent the glitch from propagating out of the modulation circuit 22 along signal path 14 toward the demodulator circuit's 62 exclusive OR gate 64. The output from the modulation circuit 22' is the modulated signal 14. In some embodiments the envelope signal 20' also is output.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. An apparatus for reducing a set of detectable EMI emissions along conductive signal paths within a digital system which are attributable to a first synchronous signal, the digital system having a source circuit generating the first synchronous signal for distribution to a destination circuit, the apparatus comprising:

the first synchronous signal occurring at the source circuit and having a first signal frequency spectrum comprising a first frequency and a set of harmonics of the first frequency;

a first envelope signal having a first envelope frequency spectrum comprising a set of primary frequencies not greater than the first frequency and defining a first bandwidth;

a modulation circuit within the source circuit receiving the first synchronous signal and the first envelope signal, the modulation circuit amplitude modulating the first synchronous signal and the envelope signal to generate a dual side band suppressed carrier signal having dual side bands about the first frequency and about the set of harmonics of the first frequency;

a first conductive signal path within the digital system routing the dual side band suppressed carrier signal from the source circuit to the destination circuit;

a second envelope signal having a second envelope frequency spectrum equal to the first envelope frequency spectrum and defining a second bandwidth equal to the first bandwidth; and a demodulation circuit within the destination circuit receiving the dual side band suppressed carrier signal via the first conductive signal path and receiving the second envelope signal, the demodulation circuit for amplitude demodulating the dual side band suppressed carrier signal with the second envelope signal to regenerate the first synchronous signal for use by the destination circuit, wherein the set of detectable EMI emissions attributable to the first synchronous signal are reduced by not routing the first synchronous signal from the source circuit to the destination circuit and instead routing the dual side band suppressed carrier signal, the dual side band suppressed carrier signal having energy spread over the first bandwidth, the first bandwidth being wide enough to reduce the set of detectable EMI emissions.

2. The apparatus of claim 1, in which the set of primary frequencies of the first envelope frequency spectrum exclude frequencies greater than one-half of the first frequency.

3. The apparatus of claim 1, in which the first bandwidth exceeds 60 kHz.

4. The apparatus of claim 1, in which the first envelope frequency spectrum has a least primary frequency and a greatest primary frequency; and wherein the first bandwidth of the first envelope frequency spectrum is the greatest primary frequency minus the least primary frequency; and wherein the greatest primary frequency is greater than 60 kHz.

5. The apparatus of claim 1, further comprising: a second conductive signal path electrically coupling the source circuit and the destination circuit; and wherein the first envelope signal is routed from the source circuit to the destination circuit via the second conductive signal path, thereby creating a received first envelope signal; and wherein the second envelope signal is the received first envelope signal.

6. The apparatus of claim 1, further comprising: a first envelope signal generator at the source circuit for generating the first envelope signal and a second envelope signal generator at the destination circuit for generating the second envelope signal.

7. The apparatus of claim 6, in which the first envelope signal generator receives a predefined key from which the first envelope signal is derived and which the second envelope signal generator receives the predefined key from which the second envelope signal is derived.

8. The apparatus of claim 7 in which the predefined key changes.

9. A method for reducing a set of detectable EMI emissions in a digital system, comprising the steps of:

amplitude modulating a first synchronous signal at a source using a first envelope signal to derive a dual side band suppressed carrier signal, the first synchronous signal having a first signal frequency spectrum comprising a first frequency and a set of harmonics of the first frequency, the first envelope signal having a first envelope frequency spectrum comprising a set of primary frequencies not greater than the first frequency and defining a first bandwidth;

routing the dual side band suppressed carrier signal from the source to a destination via a first off-chip signal path; and amplitude demodulating the dual side band suppressed carrier signal using a second envelope signal at the destination to regenerate the first synchronous signal, the second envelope signal having a second envelope frequency spectrum equal to the first envelope frequency spectrum and defining a second bandwidth equal to the first bandwidth;

wherein the set of detectable EMI emissions attributable to the first synchronous signal are reduced by not routing the first synchronous signal from the source to the destination and instead routing the dual side band suppressed carrier signal, the dual side band suppressed carrier signal having energy spread over the first bandwidth, the first bandwidth being wide enough to reduce the set of detectable EMI eimssion.

10. The method of claim 9, in which the set of primary frequencies of the first envelope spectrum exclude frequencies greater than one-half of the first frequency.

11. The method of claim 9, in which the first bandwidth exceeds 60 kHz.

12. The method of claim 9, further comprising the step of routing the first envelope signal from the source to the destination via a second off chip signal path, thereby creating a received first envelope signal; and wherein the second envelope signal is the received first envelope signal.

13. The method of claim 9, further comprising the steps of:

generating the first envelope signal from a first predefined key input to a first envelope signal generator at the source; and generating the second envelope signal from a second predefined key input to a second envelope signal generator at the destination, wherein the first predefined key equals the second predefined key.

14. The method of claim 9, further comprising the steps of:

routing a predefined key to a first envelope signal generator at the source and a second envelope signal generator at the destination;

generating the first envelope signal from the predefined key inputted into the first envelope signal generator; and generating the second envelope signal from the predefined key inputted into the second envelope signal generator.

15. The method of claim 14 in which the predefined key changes.

* * * * *

UNITED STATES PATENT AND TRADEMARK OFFICE
CERTIFICATE OF CORRECTION

PATENT NO : 5,889,819
DATED : March 30, 1999
INVENTOR(S) : Arnett

It is certified that error appears in the above-identified patent and that said Letters Patent is hereby corrected as shown below:

Column 7, (line 20), delete "circuit," and insert therefor --circuit;--.
Column 7, (line 56), after "and" insert --in--.
Column 8, (line 28), delete "eimssion" and insert therefor --emissions--.
Column 8, (line 36), delete "off chip" and insert therefor --off-chip--.

Signed and Sealed this

Eighth Day of August, 2000

Attest:

Q. TODD DICKINSON

Attesting Officer

Director of Patents and Trademarks